(12) United States Patent
Chen et al.

(10) Patent No.: US 9,465,639 B2
(45) Date of Patent: Oct. 11, 2016

(54) RESOURCE ADJUSTMENT METHODS AND SYSTEMS FOR VIRTUAL MACHINES

(71) Applicant: Quanta Computer Inc., Kuei Shan Hsiang, Tao Yuan Shien (TW)

(72) Inventors: Wen-Kuang Chen, Tao Yuan Shien (TW); Chun-Hung Chen, Tao Yuan Shien (TW); Chien-Kuo Hung, Tao Yuan Shien (TW); Tien-Chin Fang, Tao Yuan Shien (TW); Chen-Chung Lee, Tao Yuan Shien (TW)

(73) Assignee: QUANTA COMPUTER INC., Taoyuan (TW)

(*) Notice: Subject to any disclaimer, the term of this patent is extended or adjusted under 35 U.S.C. 154(b) by 153 days.

(21) Appl. No.: 14/332,658

(22) Filed: Jul. 16, 2014

(65) Prior Publication Data
US 2015/0249615 A1    Sep. 3, 2015

(30) Foreign Application Priority Data
Mar. 3, 2014  (TW) ............................. 103106956 A

(51) Int. Cl.
G06F 15/173 (2006.01)
G06F 9/455 (2006.01)
G06F 9/50 (2006.01)

(52) U.S. Cl.
CPC ......... *G06F 9/45558* (2013.01); *G06F 9/5088* (2013.01); *G06F 2009/4557* (2013.01)

(58) Field of Classification Search
CPC ............... H04L 47/20; H04L 67/1004; H04L 67/1029; H04L 67/1031; G06F 2009/45595
USPC ............................................... 709/223, 226
See application file for complete search history.

(56) References Cited

U.S. PATENT DOCUMENTS

| 2004/0221290 A1* | 11/2004 | Casey ..................... G06F 9/50 718/104 |
| 2009/0276771 A1* | 11/2009 | Nickolov .............. G06F 9/4856 717/177 |

(Continued)

FOREIGN PATENT DOCUMENTS

| TW | 200627275 | 8/2006 |
| TW | 201327205 | 7/2013 |

(Continued)

OTHER PUBLICATIONS

Chinese language office action dated Dec. 10, 2015, issued in application No. TW 103106956.

*Primary Examiner* — Wing F Chan
*Assistant Examiner* — Andrew Woo
(74) *Attorney, Agent, or Firm* — McClure, Qualey & Rodack, LLP

(57) ABSTRACT

A resource adjustment system and method for virtual machines (VMs) are provided. The method includes: obtaining, by a monitoring module, performance and status information of a first server and at least one VM of the first server; estimating, by an estimating module, the first server and each VM according to the performance and status information and an evaluation index and obtaining a server estimation score of the first server and a virtual machine estimation score of every VM; and finding, by a moving module, a second server according to the performance and status information and the evaluation index when a virtual machine estimation score of at least one first VM of the first server or the server estimation score exceeds a threshold, finding at least one VM suitable to be moved according to a moving order, and moving the at least one VM to the second server.

12 Claims, 6 Drawing Sheets

(56) References Cited

U.S. PATENT DOCUMENTS

2013/0036323 A1* 2/2013 Goose ................ G06F 11/1484
714/4.11
2015/0039764 A1* 2/2015 Beloglazov ............ H04L 47/70
709/226

FOREIGN PATENT DOCUMENTS

| TW | 201327488 | 7/2013 |
| TW | 201403479 | 1/2014 |

* cited by examiner

RESOURCE ADJUSTMENT METHODS AND SYSTEMS FOR VIRTUAL MACHINES

CROSS REFERENCE TO RELATED APPLICATIONS

This Application claims priority of Taiwan Patent Application No. 103106956, filed on Mar. 3, 2014, the entirety of which is incorporated by reference herein.

BACKGROUND OF THE INVENTION

1. Field of the Invention

The disclosure relates generally to resource adjustment methods and systems for virtual machines, and more particularly to methods and systems that directly perform resource adjustment for virtual machines (VMs) without turning off the VMs.

2. Description of the Related Art

A VM is a software implementation of hardware on which an operating system runs. Users can install operating systems on a VM as they would on a physical machine. Generally, a physical device may have several resources, such as a central processing unit and memory, in which a part or all of the resources can be allotted to one or more VMs for use. That is, the respective software executed by a specific VM can only use the resources allotted to the specific VM.

In some cases, when the resources of a VM are not enough to meet users' requirements, the resources of the VM have to be adjusted. Conventionally, the resources of a fully virtualized VM are not enough, which may result in the VM being turned off or shutting down. Therefore, the VM that has a lower importance needs to be turned off due to resource adjustment. When the VM has to provide uninterrupted services, but need to be turned off due to the related servers and programs being force interrupted, operational inconveniences result. Consequently, required resources cannot always be provided to the VM in real time.

BRIEF SUMMARY OF THE INVENTION

A detailed description is given in the following embodiments with reference to the accompanying drawings.

A resource adjustment system and method for virtual machines (VMs) are provided.

In one exemplary embodiment, the disclosure is directed to a resource adjustment system for virtual machines (VMs). The resource adjustment system comprises a monitoring module, an estimating module and a moving module. The monitoring module is configured to obtain performance and status information of a first server and performance and status information of at least one virtual machine of the first server. The estimating module is configured to estimate the first server and at least one virtual machine according to the performance and status information and an evaluation index and obtain a server estimation score of the first server and a virtual machine estimation score of every virtual machine. The moving module is configured to find a second server according to the performance and status information and the evaluation index when a virtual machine estimation score of at least one first virtual machine of the first server or a server estimation score of the first server exceeds a threshold, and find at least one virtual machine suitable to be moved according to a moving order, and move the at least one virtual machine suitable to be moved to the second server.

In one exemplary embodiment, the disclosure is directed to a resource adjustment method for virtual machines (VMs), used in a system. The method comprises: obtaining, by a monitoring module, performance and status information of a first server and performance and status information of at least one virtual machine of the first server; estimating, by an estimating module, the first server and the at least one virtual machine according to the performance and status information and an evaluation index and obtaining a server estimation score of the first server and a virtual machine estimation score of every virtual machine; and finding, by a moving module, a second server according to the performance and status information and the evaluation index when a virtual machine estimation score of at least one first virtual machine of the first server or the server estimation score of the first server exceeds a threshold, finding at least one virtual machine suitable to be moved according to a moving order, and moving the at least one virtual machine suitable to be moved to the second server.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
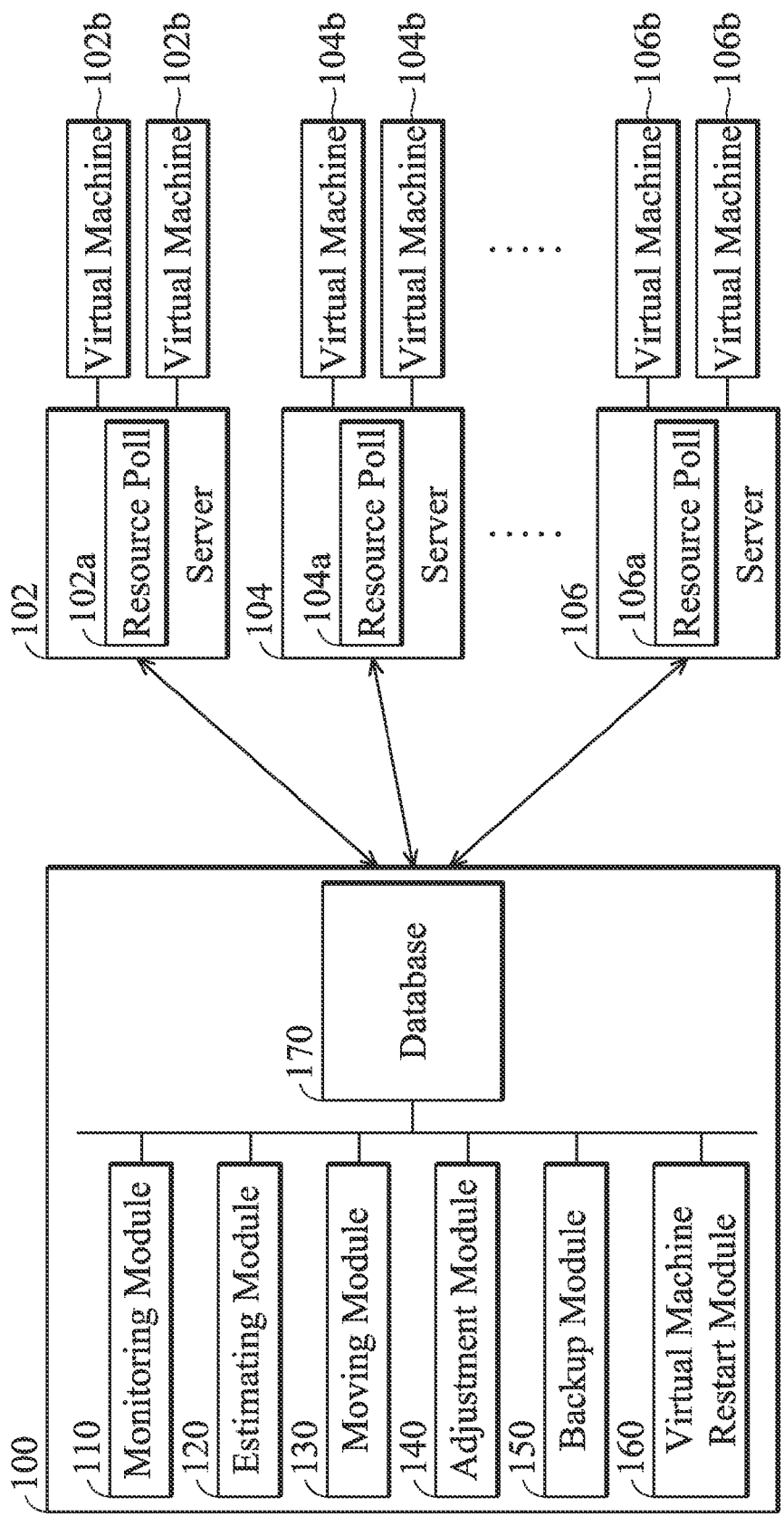
FIG. 1 is a schematic diagram illustrating a resource adjustment system for virtual machines (VMs) according to an embodiment of the present invention.

Several exemplary embodiments of the application are described with reference to FIGS. 1 through 6, which generally relate to a resource adjustment system and a resource adjustment method for virtual machines (VMs). It should be understood that the following disclosure provides various different embodiments as examples for implementing different features of the application. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a schematic diagram illustrating a resource adjustment system for virtual machines (VMs) according to an embodiment of the present invention. The resource adjustment system for virtual machines 100 can be used in at least one physical device, such as a server, a computer, a notebook, a workstation, or any kind of processor-based electronic device. In addition to being applied in the physical device, the resource adjustment system for virtual machines 100 is also applicable to other networking services, for example, grid computing, cloud software services, cloud storage services, cloud social networks and so on.

The resource adjustment system for virtual machines 100 at least comprises a monitoring module 110, an estimating module 120, a moving module 130, an adjustment module 140, a backup module 150, a virtual machine restart module 160 and a database 170. The resource adjustment system for virtual machines 100 may be installed in an independent device and connected to one or more servers (102, 104 and 106) to use/allot the resources of the resource polls (102*a*, 104*a* and 106*a*). Each server (102, 104 and 106) may have one or more virtual machines (102*b*, 104*b*, 106*b*). The resource adjustment system for virtual machines 100 may also use/allot the resources of the virtual machines (102*b*, 104*b*, 106*b*). It should be noted that the resources can be assigned to the Department of server hardware components associated with virtual machines, such as memory and other components.

The monitoring module 110 regularly obtains performance and status information of every server (102, 104 and 106) and the performance and status information of the virtual machines (102*b*, 104*b*, 106*b*) of the servers, transmits the performance and status information of every server (102, 104, 106) and the performance and status information of the virtual machines (102*b*, 104*b*, 106*b*) of the servers to the estimating module 120, and stores the performance and status information to the database 170. The performance and status information may include performance information and status information of the servers and the virtual machines. The performance information can include a central processing unit (CPU) usage rate, a transmitting/receiving capacity of the network and other information. The status information may include the connection status of the network, temperature of the servers, hard disk status of the virtual machines, connection status of the virtual machine specified ports, operating status of the virtual machines (e.g., starting the virtual machines, stopping the virtual machines, etc.) and other information. The performance and status information described above is not limited in the present invention.

After the estimating module 120 receives the performance and status information from the monitoring module 110, the estimating module 120 estimates the servers (102, 104, 106) and the virtual machines (102*b*, 104*b*, 106*b*) according to the performance and status information and an evaluation index, and obtains server estimation scores of the servers (102, 104, 106) and virtual machine estimation scores of the virtual machines (102*b*, 104*b*, 106*b*), wherein the evaluation index includes a performance index and a status index. The performance index at least includes a central processing unit (CPU) usage rate, a memory capacity and a network capacity, and the status index at least includes a network connection status, a WEB service status and a virtual machine hard disk status. In addition, the evaluation index may be divided into a server evaluation index and a virtual machine estimation index. Each evaluation index may have different weightings, and the priority of the virtual machine can be assigned based on the service settings of the virtual machines. For example, the priority of the virtual machine can be assigned based on the CPU usage rate to emphasize the importance of the CPU usage rate. In another embodiment, the estimating module 120 can further count a length of time, besides calculating the server estimation scores of the servers (102, 104, 106) and the virtual machine estimation scores of the virtual machines (102*b*, 104*b*, 106*b*). The estimating module 120 estimates the levels corresponding to the servers and the virtual machines to determine whether the servers and the virtual machines are working properly according to the length of time, the server estimation scores of the servers and the virtual machine estimation scores of the virtual machines.

When the estimating module 120 estimates a server estimation score of a first server among the servers (102, 104, 106) or a virtual machine estimation score of at least one first virtual machine of the first server exceeds a threshold, the moving module 130 finds a second server according to the performance and status information and the evaluation index, and finds at least one virtual machine suitable to be moved according to a moving order, and moves the at least one virtual machine suitable to be moved to the second server. In another embodiment, the moving module 130 may determine the priority of the virtual machine based on the service setting of the virtual machines, and exclude the servers which do not work properly.

For example, when the estimating module 120 estimates the virtual machine estimation score of the first server or the server estimation score of the first server exceeds the threshold, the moving module 130 may re-examine all the first virtual machines in the first server and move the first virtual machines with the same service first. The moving order can be assigned based on the service group setting of the first virtual machines and the weightings of the index, and the servers which do not work properly can be removed, wherein the moving order has the following two modes:

(1) For the first virtual machines exceeding the threshold in a single first server, the moving module 130 computes ratios of load estimation scores of the first virtual machines to estimation scores occupying the resources of the first server in order. If the ratios exceed a permissible value, the moving module 130 may find at least one second server suitable for moving according to the load estimation scores of the first virtual machine, and move the first virtual machines to the second server in descending order of the load estimation scores of the first virtual machine. This mode is to move the first virtual machines with higher load to the second server directly to decrease the load on the first server.

(2) The moving module 130 computes ratios of load estimation scores of the first virtual machines to estimation scores occupying the resource of the first server in order, and moves the first virtual machines to the second server in descending order of the load estimation scores of the virtual machines. This mode is to reduce the number of the first virtual machines running in the first server to decrease the load on the first server.

When the moving module 130 does not find the second server, the adjustment module 140 allocates a portion of resources in a resource pool 102*a* of the first server to the first virtual machine. In another embodiment, the adjustment module 140 may also find at least one idle virtual machine according to the virtual machine estimation scores and may recycle the resources of the idle virtual machine to the resource pool 102*a* of the first virtual machine for providing the first virtual machine for use when the moving module does not find the second server, wherein the idle virtual machine is a virtual machine having a low usage rate.

In one embodiment, the estimating module 120 re-receives the performance and status information from the monitoring module 110 at preset time intervals, and re-estimates the server estimation scores and the virtual machine estimation scores. When the estimating module 120 determines that the first server does not work properly (for example, there is an error in the first server and the first server is disconnected) according to the server estimation scores, the backup module 150 adds the first server onto a problem server list, and obtains a virtual machine list and a candidate server list corresponding to the first server from the database 170. Then, the backup module 150 finds a suitable candidate server from the candidate server list according to the server estimation scores, establishes at least one backup virtual machine in the candidate server, and stops all virtual machines in the virtual machine list and switches to the backup virtual machine. In the embodiment, after the backup module 150 stops all virtual machines in the virtual machine list and switches to the backup virtual machine, the backup module 150 recycles the backup virtual machine established in the backup server when the estimating module 120 determines that the first server returns to normal operation according to the server estimation scores and continues to operate for a period of time. It should be noted that the first server and the candidate server can be the same.

In another embodiment, when the estimating module 120 determines that at least one second virtual machine of the first server does not work properly (for example, a connection between the virtual machines and the external network is not normal or a virtual machine service cannot be provided because of an error in the hard disk) according to the virtual machine estimation scores, the backup module 150 obtains the candidate server list from the database 170, removes servers having a problem and finds a suitable candidate server from the candidate server list according to the virtual machine estimation scores. Then, the backup module 150 establishes at least one backup virtual machine in the candidate server, and stops the at least one second virtual machine and switches to the backup virtual machine. In the embodiment, after the backup module 150 stops the at least one second virtual machine and switches to the backup virtual machine, the backup module 150 recycles the backup virtual machine established in the backup server when the estimating module 120 determines that the at least one second virtual machine returns to normal operation according to the virtual machine estimation scores.

In one embodiment, the resource adjustment system for virtual machines 100 may further include a virtual machine restart module 160. When the estimating module 120 determines that the second server does not work properly, the virtual machine restart module 160 restarts the second virtual machine before the backup module 150 stops the second virtual machine and switches to the backup virtual machine. If the second virtual machine still does not work properly after being restarted by the virtual machine restart module 160, the backup module 150 stops the second virtual machine and switches to the backup virtual machine.

Figure 2:
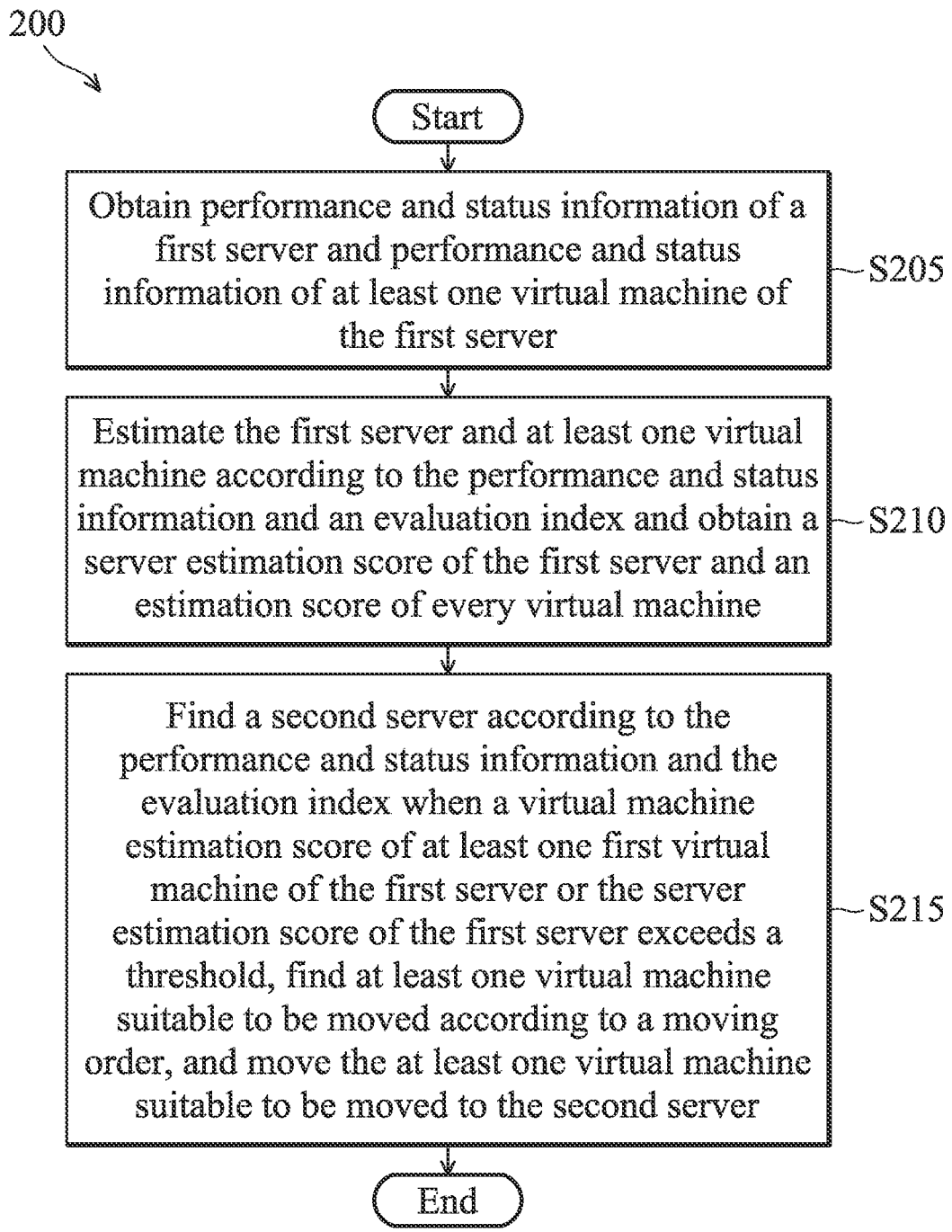
FIG. 2 is a flow diagram illustrating a resource adjustment method for virtual machines according to an embodiment of the present invention.

FIG. 2 is a flow diagram 200 illustrating a resource adjustment method for virtual machines according to an embodiment of the present invention. In this embodiment, the resource adjustment system for virtual machines can run in a virtual machine by way of the server. In step S205, a monitoring module obtains performance and status information of a first server and performance and status information of at least one virtual machine of the first server. Then, in step S210, the estimating module estimates the first server and at least one virtual machine according to the performance and status information and an evaluation index and obtains a server estimation score of the first server and an estimation score of every virtual machine. Finally, in step S215, the moving module finds a second server according to the performance and status information and the evaluation index when a virtual machine estimation score of at least one first virtual machine of the first server or the server estimation score of the first server exceeds a threshold, finds at least one virtual machine suitable to be moved according to a moving order, and moves the at least one virtual machine suitable to be moved to the second server.

Figure 3:
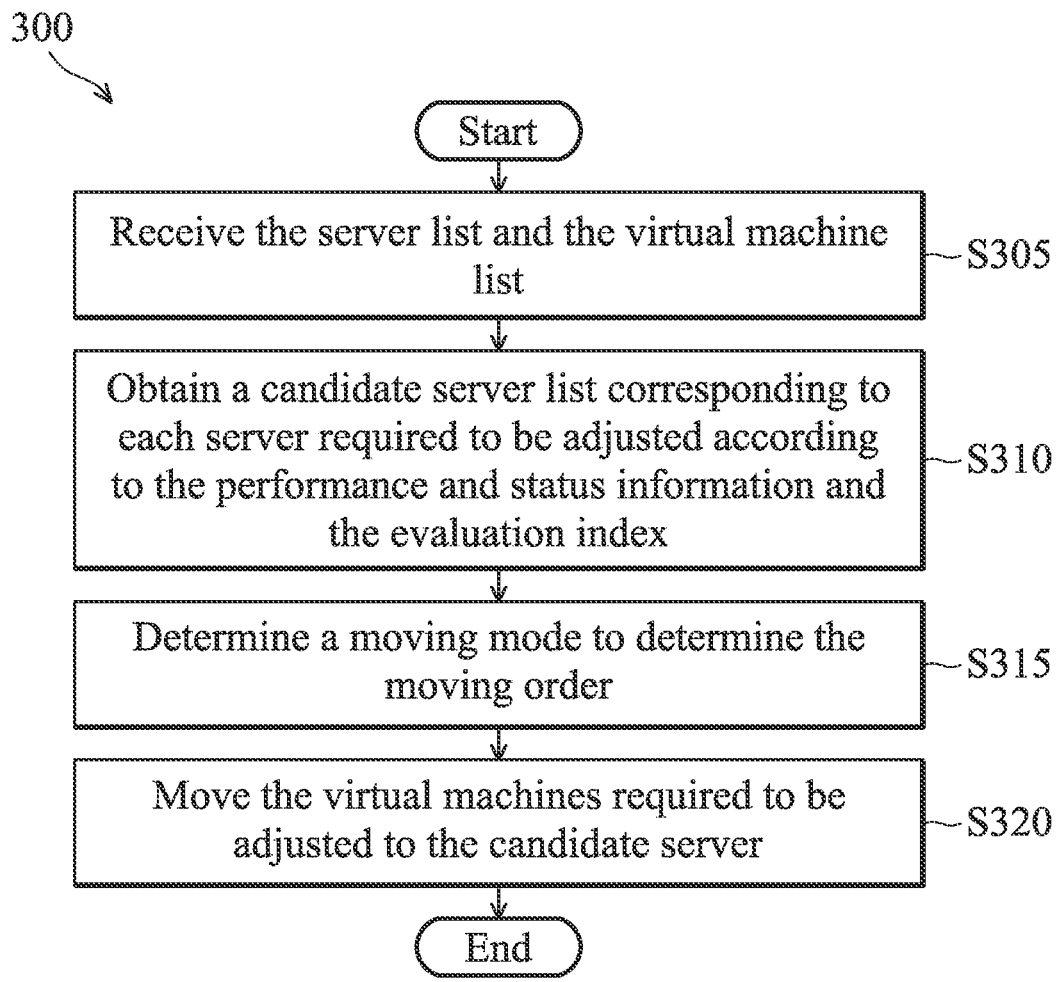
FIG. 3 is a flow diagram illustrating a procedure for moving the virtual machine according to an embodiment of the present invention.

FIG. 3 is a flow diagram 300 illustrating a procedure for moving the virtual machine according to an embodiment of the present invention. First, the estimating module has estimated the server list which records the servers required to be adjusted and the virtual machine list which records the virtual machines required to be adjusted. In step S305, the moving module receives the server list and the virtual machine list. In step S310, the moving module obtains a candidate server list corresponding to each server required to be adjusted according to the performance and status information and the evaluation index. Then, in step S315, the moving module determines a moving mode to determine the moving order. Finally, in step S320, the moving module moves the virtual machines required to be adjusted to the candidate server. In this embodiment, a user can set a service group of the virtual machine(s) in advance, so that the moving module may determine the server where the virtual machine(s) is moved to and the moving order according to the service group.

Figure 4:
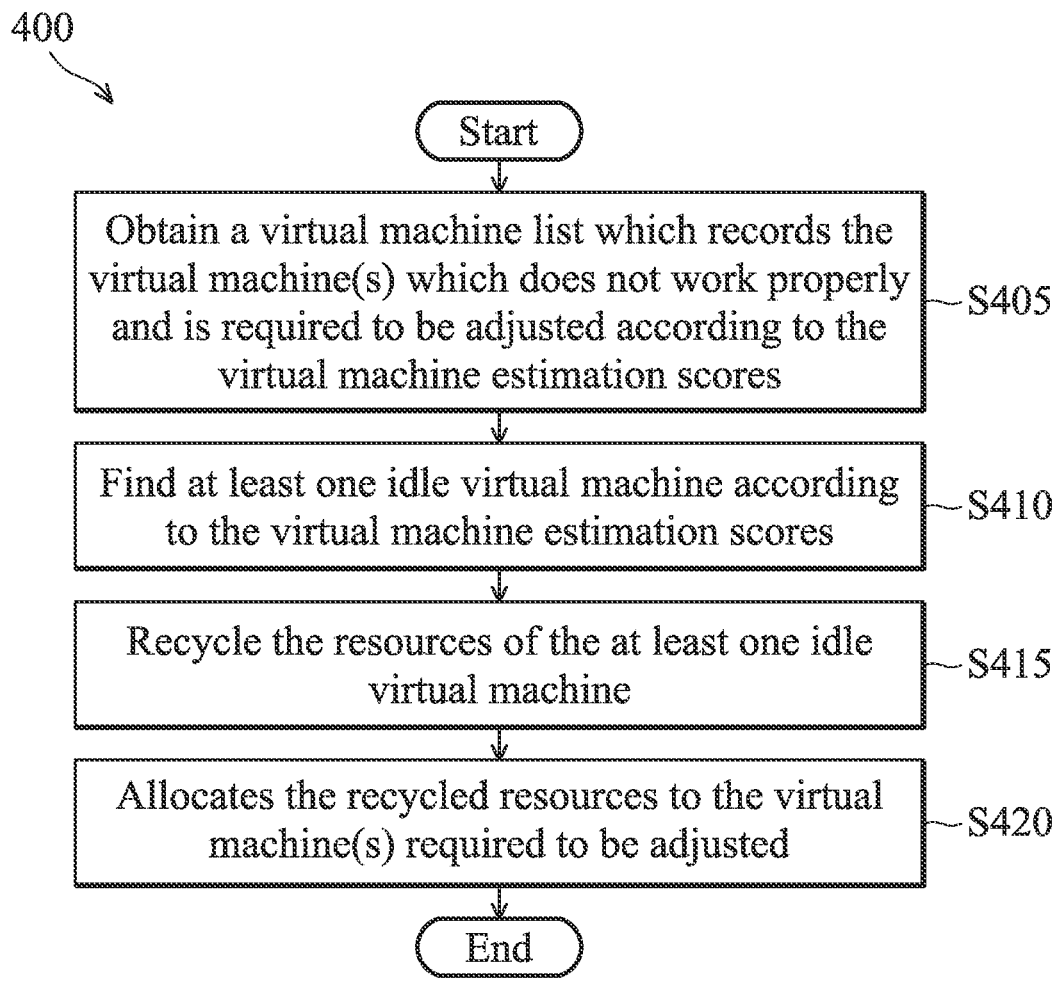
FIG. 4 is a flow diagram illustrating that the adjustment module adjusts the resources of the virtual machine according to an embodiment of the present invention.

FIG. 4 is a flow diagram 400 illustrating that the adjustment module adjusts the resources of the virtual machine according to an embodiment of the present invention, wherein the adjustment module performs the following steps when the moving module has not obtained a candidate server list. First, in step S405, the moving module obtains a virtual machine list which records the virtual machine(s) which does not work properly and is required to be adjusted according to the virtual machine estimation scores. In step S410, the adjustment module finds at least one idle virtual machine according to the virtual machine estimation scores. In step S415, the adjustment module recycles the resources of the at least one idle virtual machine. Finally, in step S420, the adjustment module allocates the recycled resources to the virtual machine(s) required to be adjusted. In addition, before the moving module performs step S405, the virtual machine restart module can restart the virtual machine(s) which does not work properly. After the virtual machine which does not work properly is restarted, the moving module performs the steps in flow diagram 400 if the virtual machine has not returned to normal operation.

Figure 5:
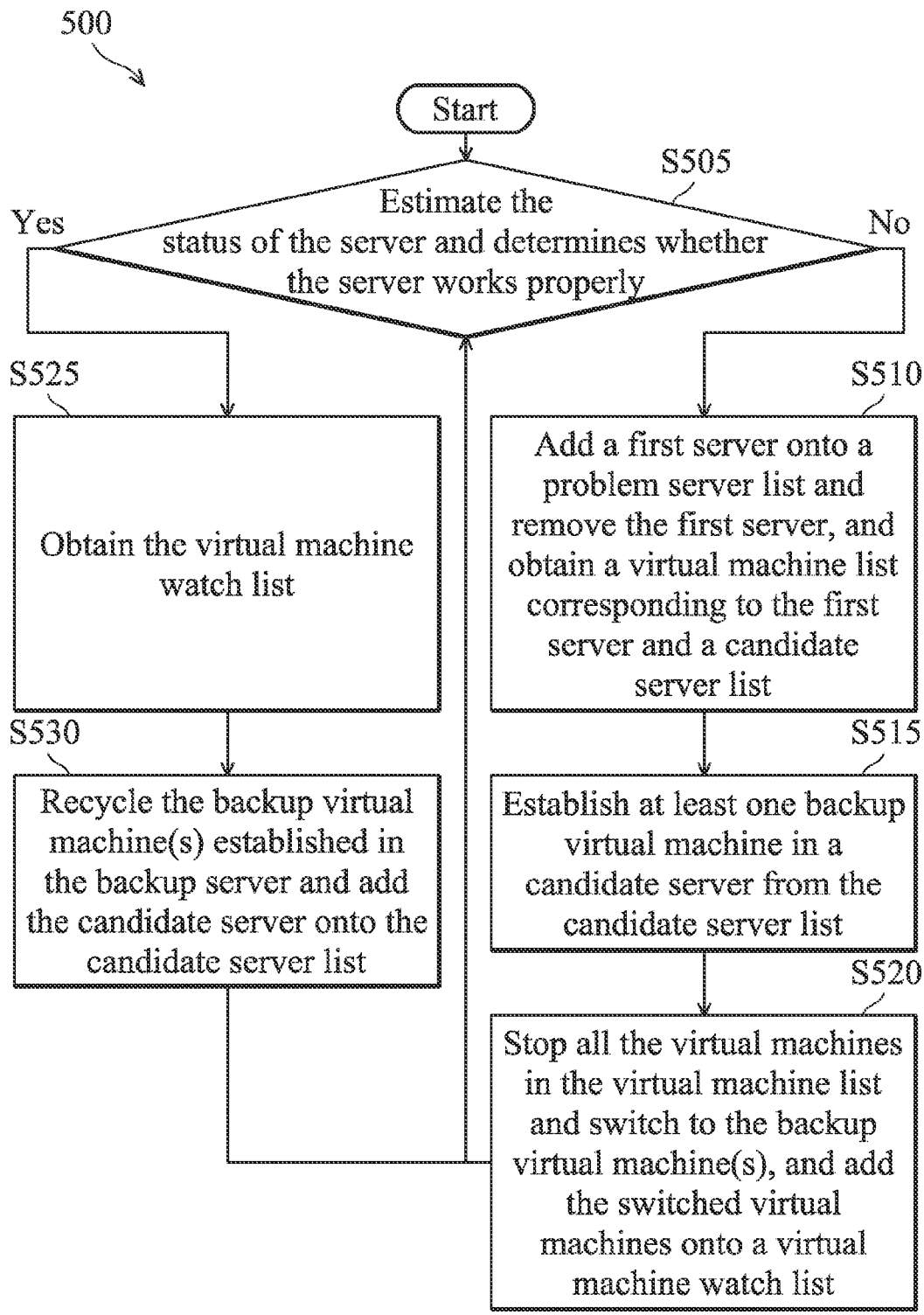
FIG. 5 is a flow diagram illustrating that the backup module rescues the virtual machine according to an embodiment of the present invention.

FIG. 5 is a flow diagram 500 illustrating that the backup module rescues the virtual machine according to an embodiment of the present invention. First, in step S505, the estimating module estimates the status of the server and determines whether the server works properly. When the estimating module determines that the server does not work properly ("No" in step S505), in step S510, the backup module adds a first server onto a problem server list and removes the first server, and obtains a virtual machine list corresponding to the first server and a candidate server list. In step S515, the backup module establishes at least one backup virtual machine in a candidate server from the candidate server list. In step S520, the backup module stops all the virtual machines in the virtual machine list and switches to the backup virtual machine(s), and adds the switched virtual machines onto a virtual machine watch list, and the method returns to step S505. When the estimating module determines that the server returns to normal operation ("Yes" in step S505), in step S525, the backup module obtains the virtual machine watch list. In step S530, the backup module recycles the backup virtual machine(s) established in the backup server and adds the candidate server onto the candidate server list. Then, the method returns to step S505, and the estimating module may continue estimate the status of the server to determine whether the server works properly. It should be noted that the backup module may add the setting of the virtual machine service group and load balance when the backup module establishes the backup virtual machine(s). Similarly, when the backup module recycles the backup virtual machine(s), the backup module may remove the setting of the virtual machine service group and load balance.

Figure 6:
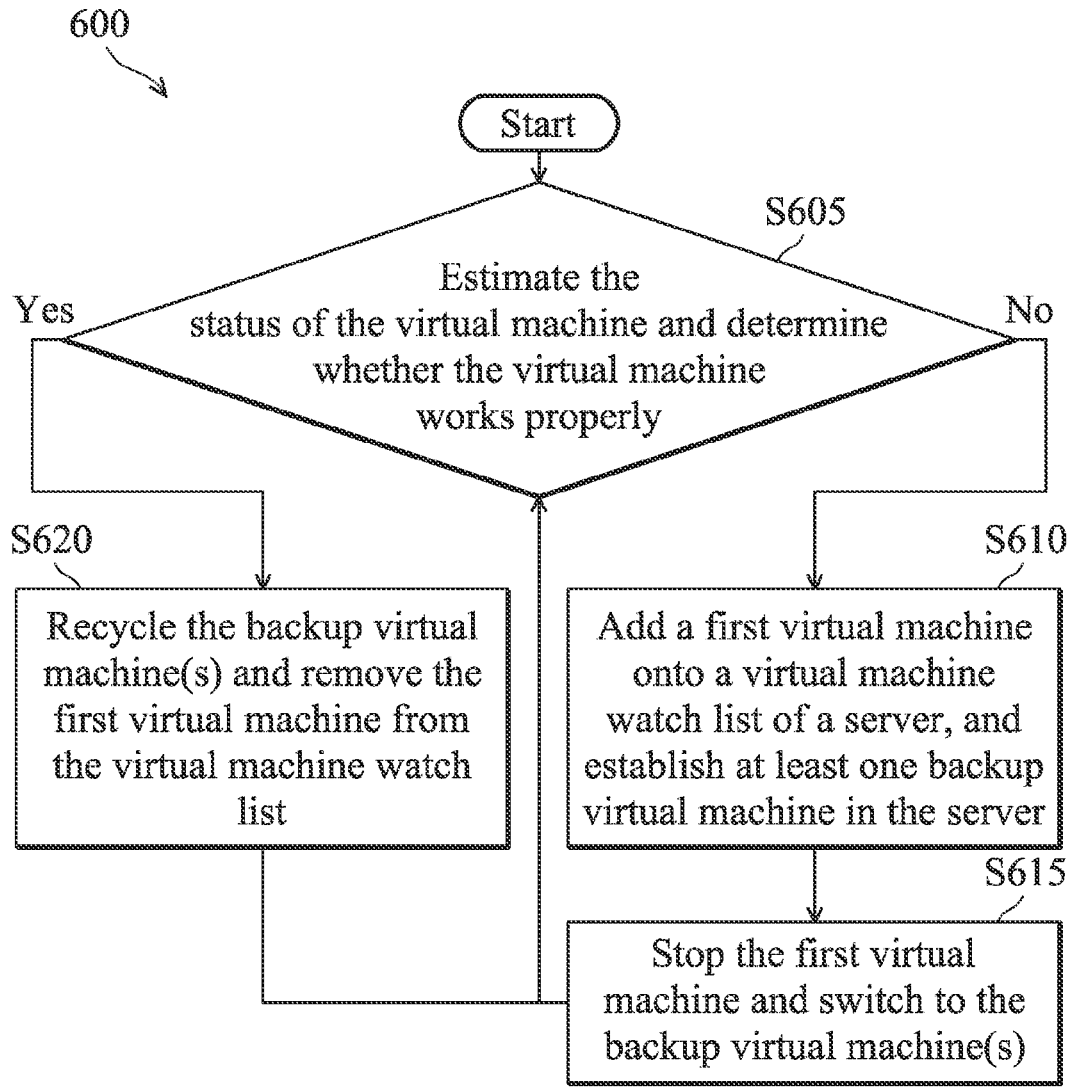
FIG. 6 is a flow diagram illustrating that the backup module rescues the virtual machine according to another embodiment of the present invention.

FIG. 6 is a flow diagram 600 illustrating that the backup module rescues the virtual machine according to another embodiment of the present invention, under the assumption that the status of the server is normal in this flow. First, in step S605, the estimating module estimates the status of the virtual machine and determines whether the virtual machine works properly. When the estimating module estimates that the first virtual machine does not work properly ("No" in step S605), in step S610, the backup module adds a first virtual machine onto a virtual machine watch list of a server, and establishes at least one backup virtual machine in the server. It should be noted that the server can be a server which the first virtual machine originally belongs to or a candidate server. In step S615, the backup module stops the first virtual machine and switches to the backup virtual machine(s), and the method returns to step S605. When the estimating module determines that the first virtual machine returns to normal operation ("Yes" in step S605), in step S620, the backup module recycles the backup virtual machine(s) and removes the first virtual machine from the virtual machine watch list. Then, the method returns to step S605, and the estimating module may continue to estimate the status of the server to determine whether the virtual machine works properly. It should be noted that the backup module may add the setting of the virtual machine service group and load balance when the backup module establishes the backup virtual machine(s). Similarly, when the backup module recycles the backup virtual machine(s), the backup module may remove the setting of the virtual machine service group and load balance. In addition, when the estimating module determines whether the virtual machine does not work properly, the virtual machine restart module may restart the virtual machine which does not work properly in advance. After the virtual machine which does not work properly is restarted, the moving module performs the steps in flow diagram 600 if the virtual machine has not returned to normal operation.

In another embodiment, when a fourth virtual machine is added into the server (102, 104, 106), the monitoring module 110 re-obtains the performance and status information of all the servers and the virtual machines, and the estimating module 120 finds a suitable server which is suitable to have the fourth virtual machine added according to the performance and status information. For example, if the estimating module 120 uses the CPU usage rate of the server as the evaluation index, the estimating module 120 can estimate the CPU usage rates of all the servers adding the fourth virtual machine, respectively, and orders the results. The estimating module 120 may add the fourth virtual machine into a server having a lower CPU usage rate preferentially. In addition, when the newly added fourth virtual machine and a virtual machine on a server have the same service module, the estimating module 120 may add the fourth virtual machine into a server having different service groups of a virtual machine preferentially to avoid the virtual machines having the same service are assembled in a certain server.

Therefore, the resource adjustment methods and systems for virtual machines can directly perform resource adjustment for virtual machines without cutting off the services of the virtual machines. In the present invention, inconvenience due to the service interruption can be avoided, and the usage rate of related resources, such as the processing and storage hardware, can be raised. Further, the whole performance of the electronic device/hardware host can be improved.

Resource adjustment methods for virtual machines, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A resource adjustment system for virtual machines (VMs), comprising:
   a processor and a memory;
   a monitoring module, obtaining performance and status information of a first server and performance and status information of at least one virtual machine of the first server;
   an estimating module, estimating the first server and at least one virtual machine according to the performance and status information and an evaluation index and obtain a server estimation score of the first server and a virtual machine estimation score of every virtual machine, wherein the estimating module re-receives the performance and status information from the monitoring module at preset time intervals, and re-estimates the server estimation score of the first server and the virtual machine estimation score of every virtual machine;

a moving module, finding a second server according to the performance and status information and the evaluation index when a virtual machine estimation score of at least one first virtual machine of the first server or the server estimation score of the first server exceeds a threshold, and find the at least one virtual machine suitable to be moved according to a moving order, and move the at least one virtual machine suitable to be moved to the second server;

an adjustment module, performs one of operations:
  allocating a portion of resource in a resource pool of the first server to the at least one first virtual machine when the moving module does not find the second server; or
  finding at least one idle virtual machine according to the virtual machine estimation scores and recycling the resources of the at least one idle virtual machine to a resource pool of the at least one first virtual machine for providing the at least one first virtual machine to use when the moving module does not find the second server, a backup module, obtaining a candidate server list from a database, establish at least one backup virtual machine in a candidate server from the candidate server list, stops at least one second virtual machine and switches to a backup server when the estimating module determines that the at least one second virtual machine of the first server does not work properly according to the virtual machine estimation score of every virtual machine; and a virtual machine restart module, restarting the at least one second virtual machine before the backup module stops the at least one second virtual machine and switches to the at least one backup virtual machine, when the estimating module determines that the second server does not work properly.

2. The resource adjustment system for virtual machines (VMs) as claimed in claim 1, wherein the estimating module re-receives the performance and status information from the monitoring module at preset time intervals, and re-estimates the server estimation score of the first server and the virtual machine estimation score of every virtual machine, and the system further comprises:
  the backup module, obtaining a virtual machine list and the candidate server list corresponding to the first server from the database, establish the at least one backup virtual machine in the candidate server from the candidate server list, stop all virtual machines in the virtual machine list and switches to the at least one backup virtual machine when the estimating module determines that the first server does not work properly according to the server estimation score of the first server.

3. The resource adjustment system for virtual machines (VMs) as claimed in claim 2, wherein after the backup module stops all virtual machines in the virtual machine list and switches to the backup virtual machine, the backup module recycles the at least one backup virtual machine established in the backup server when the estimating module determines that the first server returns to normal operation according to the server estimation score of the first server.

4. The resource adjustment system for virtual machines (VMs) as claimed in claim 1, wherein after the backup module stops the at least one second virtual machine and switches to the backup server, the backup module recycles the at least one backup virtual machine established in the backup server when the estimating module determines that the at least one second virtual machine returns to normal operation according to the virtual machine estimation score of every virtual machine.

5. The resource adjustment system for virtual machines (VMs) as claimed in claim 1, wherein when adding a fourth virtual machine, the monitoring module re-obtains the performance and status information, and the estimating module finds a third server suitable to add the fourth virtual machine according to the performance and status information and the evaluation index.

6. The resource adjustment system for virtual machines (VMs) as claimed in claim 1, wherein the evaluation index includes a performance index and a status index, wherein the performance index at least includes a central processing unit (CPU) usage rate, a memory capacity, a network capacity, and the status index at least includes a network connection status, a WEB service status and a virtual machine hard disk status.

7. A resource adjustment method for virtual machines (VMs), used in a system, comprising:
  obtaining, by a monitoring module, performance and status information of a first server and performance and status information of at least one virtual machine of the first server;
  estimating, by an estimating module, the first server and the at least one virtual machine according to the performance and status information and an evaluation index and obtaining a server estimation score of the first server and a virtual machine estimation score of every virtual machine, wherein the estimating module re-receives the performance and status information from the monitoring module at preset time intervals, and re-estimates the server estimation score of the first server and the virtual machine estimation score of every virtual machine;
  finding, by a moving module, a second server according to the performance and status information and the evaluation index when a virtual machine estimation score of at least one first virtual machine of the first server or the server estimation score of the first server exceeds a threshold, finding the at least one virtual machine suitable to be moved according to a moving order, and moving the at least one virtual machine suitable to be moved to the second server;
  performing one of operations:
  allocating a portion of resource in a resource pool of the first server to the at least one first virtual machine when the moving module does not find the second server; or
  finding at least one idle virtual machine according to the virtual machine estimation scores and recycling the resources of the at least one idle virtual machine to a resource pool of the at least one first virtual machine for providing the at least one first virtual machine to use when the moving module does not find the second server,
  obtaining, by a backup module, a candidate server list from a database, establishing at least one backup virtual machine in a candidate server from the candidate server list, stopping at least one second virtual machine and switching to a backup server when the estimating module determines that the at least one second virtual machine of the first server does not work properly according to the virtual machine estimation score of every virtual machine; and
  restarting, by a virtual machine restart module, the at least second virtual machine before the backup module stops the at least second virtual machine and switches to the at least one backup virtual machine, when the estimating module determines that the second server does not work properly.

8. The resource adjustment method for virtual machines (VMs) as claimed in claim 7, wherein the estimating module receives the performance and status information from the monitoring module at preset time intervals, and re-estimates the server estimation score of the first server and the virtual machine estimation score of every virtual machine, and the method further comprises:

obtaining, by the backup module, a virtual machine list and the candidate server list corresponding to the first server from the database, establishing the at least one backup virtual machine in the candidate server from the candidate server list, stopping all virtual machines in the virtual machine list and switching to the at least one backup virtual machine when determining that the first server does not work properly by the estimating module according to the server estimation score of the first server.

9. The resource adjustment method for virtual machines (VMs) as claimed in claim 8, wherein the backup module further performs the following steps after the backup module stops all virtual machines in the virtual machine list and switches to the backup virtual machine:

recycling the at least one backup virtual machine established in the backup server when the estimating module determines that the first server returns to normal operation according to the server estimation score of the first server.

10. The resource adjustment method for virtual machines (VMs) as claimed in claim 7, wherein the backup module further performs the following steps after the backup module stops the at least one second virtual machine and switches to the backup server:

recycling the at least one backup virtual machine established in the backup server when the estimating module determines that the at least one second virtual machine returns to normal operation according to the virtual machine estimation score of every virtual machine.

11. The resource adjustment method for virtual machines (VMs) as claimed in claim 7, further comprising:

re-obtaining, by the monitoring module, the performance and status information when adding a fourth virtual machine; and finding, by the estimating module, a third server suitable to add the fourth virtual machine according to the performance and status information and the evaluation index.

12. The resource adjustment method for virtual machines (VMs) as claimed in claim 7, wherein the evaluation index includes a performance index and a status index, wherein the performance index at least includes a central processing unit (CPU) usage rate, a memory capacity, a network capacity, and the status index at least includes a network connection status, a WEB service status and a virtual machine hard disk status.

* * * * *